United States Patent
Singh et al.

(10) Patent No.: US 9,032,523 B2
(45) Date of Patent: *May 12, 2015

(54) ROLLBACK FEATURE

(71) Applicant: McAfee, Inc., Santa Clara, CA (US)

(72) Inventors: Prabhat Kumar Singh, Bangalore (IN); Nitin Jyoti, Karnataka (IN); Gangadharasa Srinivasa, Karnataka (IN)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/027,895

(22) Filed: Sep. 16, 2013

(65) Prior Publication Data

US 2014/0026218 A1    Jan. 23, 2014

Related U.S. Application Data

(63) Continuation of application No. 12/611,375, filed on Nov. 3, 2009, now Pat. No. 8,539,583.

(51) Int. Cl.
*H04L 29/06* (2006.01)
*G06F 21/56* (2013.01)
*G06F 17/30* (2006.01)

(52) U.S. Cl.
CPC ........ *G06F 21/562* (2013.01); *G06F 17/30109* (2013.01); *G06F 21/56* (2013.01); *G06F 21/568* (2013.01)

(58) Field of Classification Search
CPC .................................................. G06F 21/562
USPC .......................................................... 726/23
See application file for complete search history.

(56) References Cited

U.S. PATENT DOCUMENTS

| | | | |
|---|---|---|---|
| 5,987,610 A | 11/1999 | Franczek et al. |
| 6,073,142 A | 6/2000 | Geiger et al. |
| 6,460,050 B1 | 10/2002 | Pace et al. |
| 7,188,368 B2 | 3/2007 | Swimmer et al. |
| 7,506,155 B1 | 3/2009 | Stewart et al. |
| 7,640,589 B1 | 12/2009 | Mashevsky |
| 7,716,743 B2 | 5/2010 | Costea et al. |

(Continued)

FOREIGN PATENT DOCUMENTS

KR    2007111603    11/2007

OTHER PUBLICATIONS

Ammann, P.; Jajodia, S.; Peng Liu;, "Recovery from malicious transactions," Knowledge and Data Engineering, IEEE Transactions on, vol. 14, No. 5, pp. 1167-1185, Sep./Oct. 2002 doi: 10.1109/TKDE.2002.1033782, URL: http://ieeexplore.ieee.org/stamp/stamp.jsp?tp=&arnumber=1033782&isnumber=22199.

(Continued)

*Primary Examiner* — Michael S. McNally
(74) *Attorney, Agent, or Firm* — Patent Capital Group

(57) ABSTRACT

A file stored in a first portion of a computer memory of a computer is determined to be a malicious file. A duplicate of the file is stored in a quarantine area in the computer memory, the quarantine area being in a second portion of the computer memory that is different from the first portion of the computer memory. One or more protection processes are performed on the file. The determination that the file is a malicious file is determined to be a false positive and the file is restored, during a boot sequence, to a state prior to the one or more protection processes being performed on the file.

22 Claims, 4 Drawing Sheets

(56) References Cited

U.S. PATENT DOCUMENTS

| | | | |
|---|---|---|---|
| 8,028,338 B1 | 9/2011 | Schneider | |
| 8,306,988 B1 * | 11/2012 | Jyoti et al. | 707/754 |
| 8,539,582 B1 * | 9/2013 | Aziz et al. | 726/24 |
| 8,566,946 B1 * | 10/2013 | Aziz et al. | 726/25 |
| 2004/0187023 A1 | 9/2004 | Alagna et al. | |
| 2005/0064859 A1 | 3/2005 | Kotzin et al. | |
| 2007/0079379 A1 | 4/2007 | Sprosts et al. | |
| 2007/0240220 A1 | 10/2007 | Tuvell | |
| 2009/0044272 A1 | 2/2009 | Jarrett | |
| 2009/0187991 A1 | 7/2009 | Freericks et al. | |
| 2009/0271866 A1 | 10/2009 | Liske | |
| 2009/0282485 A1 | 11/2009 | Bennett | |
| 2009/0282486 A1 | 11/2009 | Zimmer et al. | |
| 2009/0327637 A1 | 12/2009 | Chouery | |
| 2010/0083376 A1 * | 4/2010 | Pereira et al. | 726/22 |
| 2013/0031111 A1 | 1/2013 | Jyoti et al. | |

OTHER PUBLICATIONS

Schmid et al., "Protecting Data From Malicious Software" Proceedings of the 18th Annual Computer Security Applications Conference (ACSAC '02), Dec. 2002, 10 pages.

Notification of Transmittal of the International Search Report and the Written Opinion of the International Searching Authority, or the Declaration for PCT/US2010/055308 dated Jun. 20, 2011, 8 pages.

International Preliminary Report on Patentability issued May 8, 2012 and Written Opinion mailed Jun. 20, 2011 for International Application No. PCT/US2010/055308, 4 pages.

\* cited by examiner

ROLLBACK FEATURE

RELATED APPLICATION

This application is a continuation (and claims the benefit of priority under 35 U.S.C. §120) of U.S. patent application Ser. No. 12/611,375, filed Nov. 3, 2009, entitled, "ROLLBACK FEATURE" by inventors Prabhat Singh et al. The disclosure of the prior application is considered part of (and is incorporated by reference in) the disclosure of this application.

BACKGROUND

This application relates to malware protection programs.

Because malware programs are becoming increasingly sophisticated and aggressive, malware protection programs are forced to become more aggressive in their identification and handling of malicious files. Thus, malware protection programs are continuously generating new methods of identifying and remediating malicious files. Some of the more recent methods include behavioral detection, automatic signature creation, heuristic detections, and black listing packets. These detection methods and other commonly used methods are used to anticipate new, undetected malware that exhibit characteristics associated with known malware.

As malware protection programs become more aggressive in their methods of detection, there is an increasing risk of false positive identifications. A false positive identification occurs when a file is incorrectly identified as a malicious file. A problem with false positive identifications is that malware programs unknowingly remediate files that were false identified in the same manner as known malware, including the quarantining or deleting of the malicious file. These remediation techniques can have significant impacts on users and businesses. In some instances, the impact of removing or disabling a file that was falsely identified renders critical software inoperable.

SUMMARY

In general, one innovative aspect of the subject matter described in this specification can be embodied in methods that include the actions of determining, by a malware protection program executing on a computer, that a file stored in first portion of a computer memory of the computer is a malicious file; storing a duplicate of the file in a quarantine area in the computer memory, the quarantine area being in a second portion of the computer memory that is different from the first portion of the computer memory; performing, by the malware protection program, one or more protection processes on the file; determining whether the determination that the file is a malicious file is a false positive determination; in response to determining that the determination that the file is a malicious file is a false positive determination: restoring the file by a pre-boot rollback process executing on the computer during a boot sequence to a state prior to the one or more protection processes performed on the file; and booting the computer with the restored file; and in response to determining that the determination that the file is a malicious file is not a false positive determination, not restoring the file to a state prior to the one or more protection processes performed on the file. Other embodiments of this aspect include corresponding systems, apparatus, and computer programs, configured to perform the actions of the methods, encoded on computer storage devices.

Another innovative aspect of the subject matter described in this specification can be embodied in methods that include the actions of storing a duplicate file in a quarantine area, the duplicate file being a copy of a candidate malicious file that was repaired by a malware protection program, wherein the candidate malicious file consists of one or more files that were identified by the malware protection program as containing malicious content; performing, by the malware protection program, a protection process on the candidate malicious file, wherein the protection process results in modification of at least some portion of the candidate malicious file from a first portion of the computer memory; receiving a false positive data, wherein the false positive data is used to determine whether to restore the candidate malicious file; and in response to determining to restore the candidate malicious file, restoring, through a pre-boot scan during a boot sequence, the candidate malicious file to the first portion of the computer memory by replacing the candidate malicious file with the duplicate file from the quarantine area. Other embodiments of this aspect include corresponding systems, apparatus, and computer programs, configured to perform the actions of the methods, encoded on computer storage devices.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
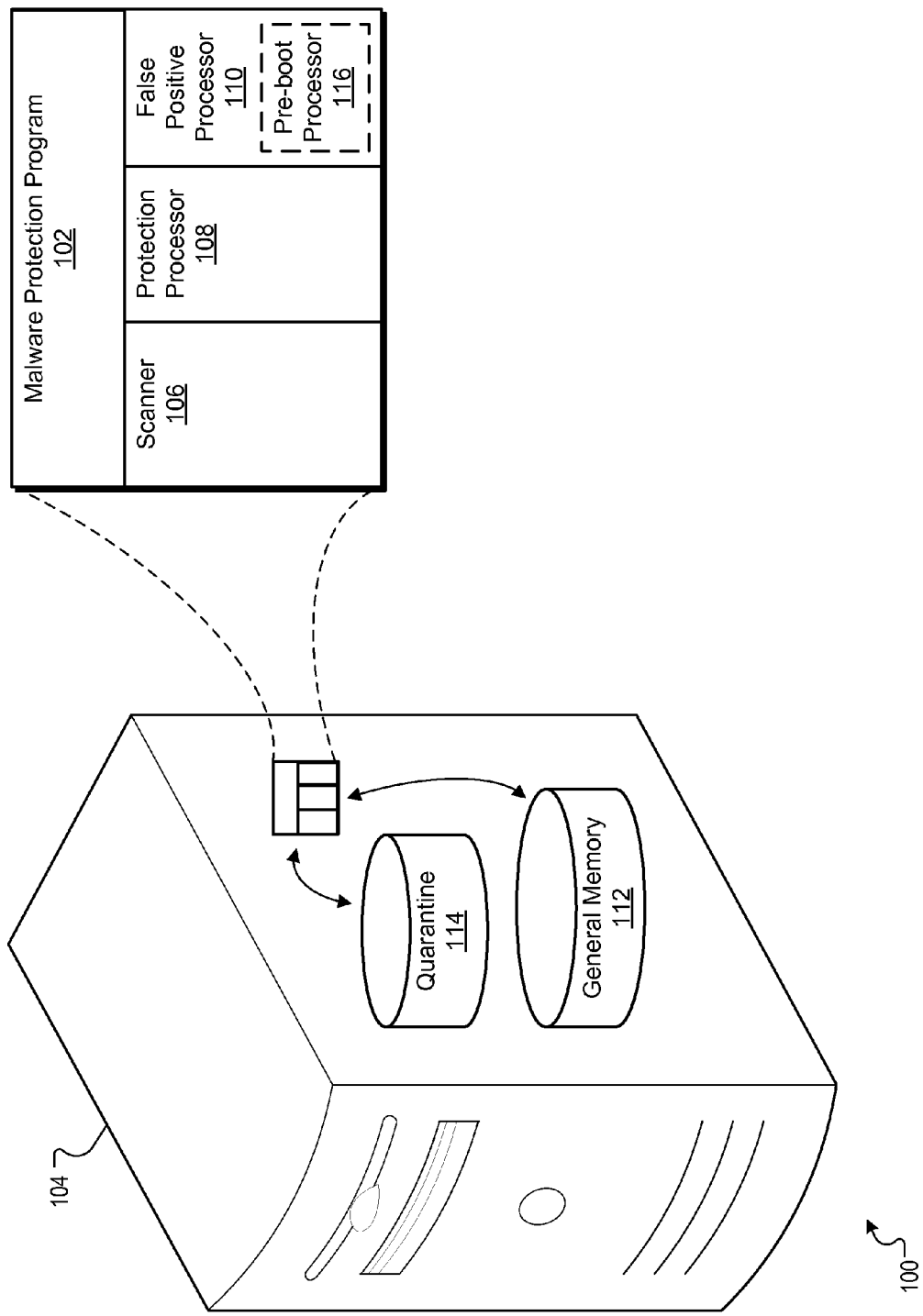
FIG. 1 is a diagram of an example malware protection program that includes a rollback feature.

FIG. 1 is a diagram 100 of an example malware protection program 102 that includes a rollback feature. The malware protection program 102, including a scanner 106, a protection processor 108 and a false positive processor 110, operate on a computer 104. The computer 104 also includes a quarantine 114 and a general memory 112. The quarantine 114 of the computer is a portion of the memory that is logically separate from any other memory components within the computer 104. For example, the quarantine can include a portion of the hard drive that is logically separated from the remainder of the hard drive. The general memory 112 can include temporary memory storage areas (e.g., RAM, ROM) and the remainder of the permanent memory storage areas (e.g., the hard drive) that is not reserved for the quarantine 114. In other implementations, the quarantine 114 is a portion of the general memory 112, e.g., a protected folder or storage area.

The malware protection program 102 protects a computer by identifying, assessing, quarantining, and remediating malicious files that reside on the computer. In some implementations, the malware protection program 102 utilizes the scanner 106 to identify instances of malicious files, and uses the protection processor 108 for handling the identified instances of malicious files. In some implementations, the scanner 106 and the protection processor 108 can be combined into a single component that functions to scan for malicious files and also process malicious files, or can be further subdivided into multiple components.

In some implementations, the scanner 106 utilizes malware definitions to determine which files are malicious. The malware definitions provide different criteria that the scanner 106 can use to identify a malicious file. For example, the malware definitions may include a list of predetermined filenames to search for, where the predetermined filenames are names of known malicious files (e.g., "virus.exe"). Additionally, in some implementations, the malware definitions may identify files that perform abnormal operations, e.g., multiple modifications to the stack pointer, or multiple references certain external DLL files.

After the scanner 106 identifies the malicious files based on the malware definitions, the protection processor 108 performs one or more protection processes on the malicious files. The type of protection process performed on each malicious file can vary. The protection process can include repairing the file, deleting the file, quarantining the file, etc. The type of protection process can be predetermined for all malicious files processed by the protection processor 108, or, in some implementations, is selected by a user. The type of protection process can be determined based on the type of the malicious files and/or the threat associated with the malicious files.

In some instances, the scanner 106 may incorrectly identify files as malicious if those files exhibit behavior similar to known malware, even if the files are not malicious files. For example, the malware definitions may identify multiple references to "library.exe" as a characteristic of a malicious file because "library.exe" is a DLL from an internet browsing software that is commonly exploited by malware. Based on these definitions, the scanner 106 may identify "goodprogram.exe," a non-malicious file, and "badprogram.exe," a malicious file, as malicious files if both of those files have multiple references to "library.exe."

In the event the file is malicious (e.g., "badprogram.exe"), the scanner 106 correctly identified a malicious file. However, the characteristics specified by the malware definitions may also incorrectly identify legitimate processes that are running on the computer (e.g., "goodprogram.exe") as malicious if the process references "library.exe" as part of the normal operation of the internet browsing process. The scanner 106 may not distinguish between the non-malicious references of "goodprogram.exe" to "library.exe" and the malicious references of "badprogram.exe" to "library.exe." Thus, the scanner 106 may incorrectly identify "goodprogram.exe" as a malicious file. Identification of "goodprogram.exe" as a malicious file by the scanner 106 is a false positive determination.

In normal operation of the program 102, the protection processor 108 performs a protection process upon the files identified as malicious, including both "goodprogram.exe" and "badprogram.exe." This protection process can include deletion of "goodprogram.exe." Thus, in spite of the fact that "goodprogram.exe" is not a malicious file, the protection processor 108 may delete the file.

To protect against the processing of a file incorrectly identified as malicious, the false positive processor 110 makes a duplicate of all files that are processed by the protection processor 108. The false positive processor 102 stores all duplicates in the quarantine 114. Because the quarantine 114 is separated from the general memory 112, items stored in the general memory 112 are not affected by the duplicates stored in the quarantine 114, even if the files stored in the quarantine 114 are malicious files. For example, the false positive processor 110 will make duplicates of "goodprogram.exe" and "badprogram.exe" and store those duplicates in the quarantine 114 before the protection processor 108 performs a protection process on either of the files.

In some implementations, the false positive processor 110 makes a duplicate copy of all candidate malicious file. A candidate malicious file can be a file that the malware protection program 102 determined is most likely a malware program, but the malware protection program 102 cannot definitively identify the candidate malicious file as a malware program. Thus, the false positive processor 110 stores a copy of the candidate malicious file in the quarantine 114.

The false positive processor 110 then determines whether a file was incorrectly identified and processed by the program 102 as a malicious file. If the false positive processor 110 determines that a file was incorrectly identified and processed by the program 102 as a malicious file, the false positive processor 110 restores the file from the quarantine 114 to the state of the file before it was processed by the program 102. The process of restoring the duplicate copy to the general memory is a rollback.

For example, after storing duplicate copies of "goodprogram.exe" and "badprogram.exe" in the quarantine 114, the protection processor 108 deleted the original instances of the files from the general memory 112 of the computer 104. Subsequent to deleting "goodprogram.exe" from the general memory 112, the false positive processor 110 determines that "goodprogram.exe" is not a malicious file. Thus, the false positive processor 110 accesses the duplicate copy of "goodprogram.exe" from the quarantine 114 and restores the duplicate copy to the general memory 112.

Figure 2:
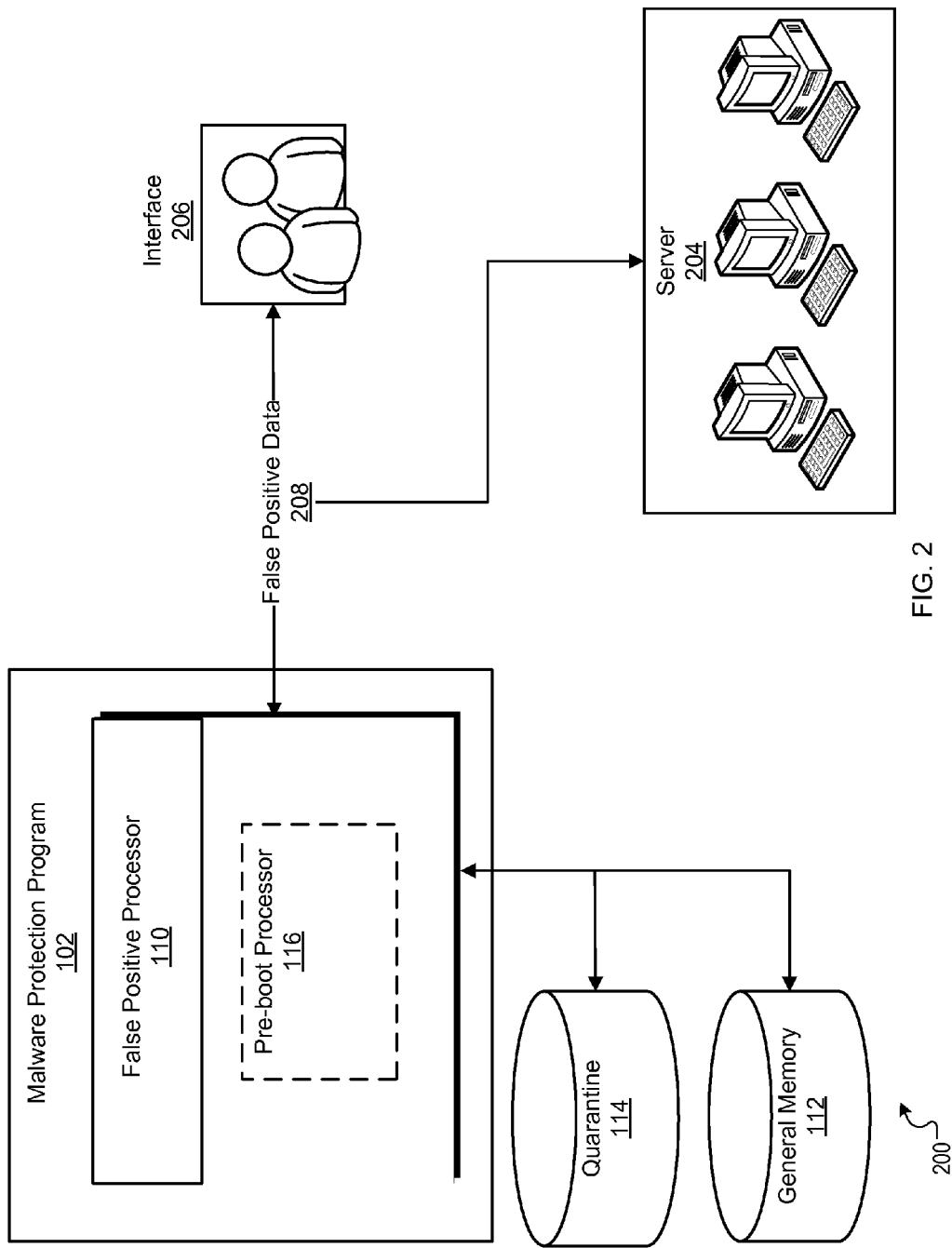
FIG. 2 is a diagram of an example false positive processor.

FIG. 2 is a diagram 200 of an example false positive processor 110. The diagram 200 includes a representation of the malware protection program 102, false positive processor 110, quarantine 114 and general memory 112 from FIG. 1. The false positive processor 110 can determine that a file was incorrectly marked as malicious (i.e., a false positive determination occurred). The false positive processor 110 can make the false positive determination during the pre-boot stage (i.e., a stage during the boot sequence prior to when the main operating system is loaded on the computer) by use of a pre-boot processor 116, or the post boot stage (i.e., a stage after the main operating system is loaded on the computer). If the false positive processor 110 makes a false positive determination, then the false positive processor 110 can perform a rollback. In some implementations, the pre-boot processor 116 of the false positive processor 110 can perform the rollback during the pre-boot stage.

The false positive processor 110 makes the false positive determination based on false positive data 208. The false positive processor 110 can receive the false positive data 208 from a server 204, or from a user 206, by use of a user interface.

§1.1 Receiving False Positive Data from the Server

In some implementations, the false positive processor 110 receives the false positive data 208 from a rollback server, e.g., the server 204. The false positive processor 110 can send the server 204 a list of signatures identifying files that are stored in quarantine. The server 204 can respond by sending the false positive data 208 identifying the files in the quarantine that are incorrectly identified as malicious. For example, the false positive processor 110 can send a list of signatures to the server 204 that includes the signatures of the files "goodprogram.exe" and "badprogram.exe." Based on an analysis of files with the same signatures as "goodprogram.exe" and "badprogram.exe," the server 204 can determine that "goodprogram.exe" is falsely identified as malicious. The server 204 sends the false positive data 208 to the false positive processor 110 of the program 102, where the false positive data 208 includes a data identifying the "goodprogram.exe" as a file in the quarantine 114 that was falsely identified as malicious. Based on this, the false positive processor 110 can determine that a false positive determination occurred when the file "goodprogram.exe" was incorrectly identified as a malicious file.

In some implementations, the sever 204 can push false positive data 208 to the false positive processor 110 that identifies files that are not malicious files, and the false positive processor 110 can determine if any of those files were in fact falsely identified as malicious by the malware program 102 during a boot sequence or a post boot stage. The server 204 can compile this list by analyzing files that are identified as malicious by different instances of malware programs using the same malware definitions as the malware program 102, and determining if these files are indeed malicious. Based on this, the server 204 can generate a list of files that are not malicious but have been identified as malicious by malware programs. The server 204 can transmit this list to the false positive processor 110 in the form of the false positive data 208. The false positive processor 110 can then determine whether any of the files in the list from the false positive data 208 were processed by the program 102.

For example, the server 204 can determine that under the malware definitions used by the malware program 102, the files "goodprogram.exe" and "betterprogram.exe" are commonly classified as malicious files, even though the files are not malicious. The server 204 can send the false positive processor 110 the false positive data 208, which is a list of files including "goodprogram.exe" and "betterprogram.exe." The false positive processor 110 can determine that the file "goodprogram.exe" is a file on the list in the false positive data 208 that is also stored in the quarantine 114. The false positive processor 110 can determine that a false positive determination occurred when the file "goodprogram.exe" was incorrectly identified as a malicious file.

§1.2 Receiving False Positive Data from the Interface

In some implementations, the false positive processor 110 receives the false positive data 208 from the interface 206. The interface 206 can receive the false positive data 208 from a user or a third party device. A user can determine that a file was incorrectly identified as malicious, and can trigger the interface 206 by pressing a "hotkey," or a set of keys programmed to trigger the interface 206. The interface 206 can include a selection menu that displays the files stored in the quarantine 114 and allows the user to select to restore one of the files from the quarantine 114.

For example, a user can run a third party software that determines the Internet browsing software is not functioning properly because a specific file is missing (e.g., "goodprogram.exe"). The user can select, through the interface 206, to undo the protection process that was performed by the malware program 102 on the missing file. Thus, the interface 206 would send to the false positive processor 110 the false positive data 208 identifying "goodprogram.exe" as a file that was falsely identified as malicious.

§1.3 Receiving False Positive During a Pre-Boot Scan

Although the aforementioned methods of receiving false positive data 208 are presumed to occur during the normal operation of the computer, those methods could also occur during a pre-boot sequence. In some implementations, the pre-boot processor 116 of the false positive processor 110 can request the false positive data 208 from the server 204 in the pre-boot sequence, prior to the operating system loading. In other implementations, the user can press the "hotkey" (i.e., set of keys programmed to trigger the interface 206) during the pre-boot sequence. The hotkey can interrupt the boot process and trigger the interface 206 prior to the operating system. The pre-boot user interface environment can provide the same functionality as the interface 206, e.g., a selection menu that displays the files stored in the quarantine 114 and allows the user to select to restore one of the files from the quarantine 114.

Thus, in some implementations, after the false positive processor 110 receives the false positive data 208, it can identify files that were falsely processed by the malware program 102 as malicious files. The false positive processor 110 can maintain a list of these files so that the files can be restored during the next boot sequence. In some implementations, the false positive processor 110 maintains a list of these files by marking the files in the quarantine 114 that are subject to a false positive determination. The false positive processor 110 can use multiple methods to mark the files, e.g., moving the marked files to a separate logical section of the quarantine 114, or maintaining a binary variable for each file in the quarantine that specifies whether the file is marked or not.

§2.0 Restoring False Positive During the Pre-Boot Scan

In some implementations, the pre-boot processor 116 can determine during the pre-boot stage if any files are marked as false positive determinations. If the pre-boot processor 116 identifies a file marked as a false positive determination, the pre-boot processor 116 can rollback the file from the quarantine 114 into the general memory 112.

Figure 3:
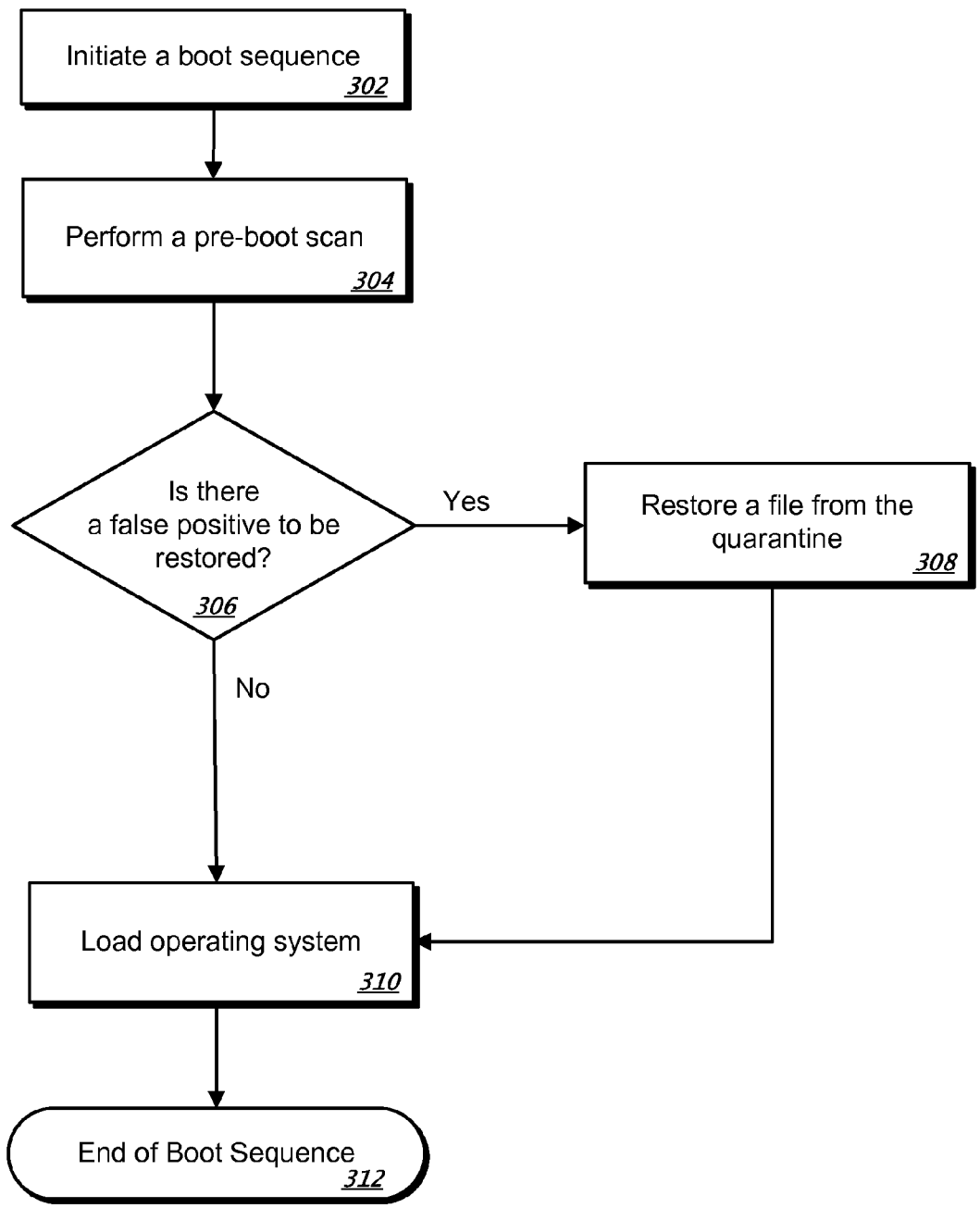
FIG. 3 is a flow diagram of an example false positive restoration process.

FIG. 3 is a flow diagram of an example false positive restoration process 300. The false positive restoration process 300 can be performed, for example, by the pre-boot processor 116 during the boot sequence before the operating system of the computer 104 loads.

Stage 302 initiates a boot sequence. The boot sequence can be initiated, for example, anytime the system is rebooted, or the system can prompt a user for a manual reboot. For example, a user may manually reboot the computer 104 periodically, or the user may manually reboot the computer 104 after the malware program 102 requests that the user reboot the computer.

Stage 304 performs a pre-boot scan. During the boot sequence, the pre-boot processor 116 can initiate a pre-boot scan. For example, during the reboot of a system, the pre-boot processor 116 can initiate a pre-boot scan that scans the files stored in the quarantine to see if any of the files are marked as false positive determinations.

Stage 306 determines if there is a false positive to be restored. In some implementations, the pre-boot scan performed by the pre-boot processor 116 determines if there are any false positive determinations that need to be rolled back. For example, the pre-boot processor 116 can scan the quarantine to determine if any files are marked as false positive determinations.

If stage 306 determines that a false positive determination occurred (i.e., there is a false positive to be restored), stage 308 can restore the file that was falsely identified as malicious from the quarantine 114. In some implementations, the pre-boot scan identifies files that the false positive processor 110 marked as falsely identified files (e.g., "goodprogram.exe"). The pre-boot processor 116 determines that "goodprogram.exe" is marked as a file that was incorrectly identified as malicious, and the false positive processor 110 restores the file "goodprogram.exe" to the general memory 112 from the quarantine 114, and also performs any other necessary tasks, such as restoring registry settings and the like.

After stage 308, or if stage 306 determines that a false positive determination had not occurred, stage 310 loads the operating system. For example, if a file was restored from the quarantine 114 at stage 308, the computer 104 loads the operating system with the restored file in the general memory.

If there was no file marked for restoration in the quarantine 114, the computer loads the operating system without performing any restoration.

Stage 312 is the end of the boot sequence. After the computer 104 has loaded the operating system, the boot sequence is done.

In some implementations, after the false positive processor 110 provides the false positive data 208 to the scanner 106 of FIG. 1. Based on the false positive data 208, the scanner 106 will know going forward which files may fit the malware definitions but are not malicious. Thus, subsequent scans by the scanner 106 will not identify the same files as malicious.

Figure 4:
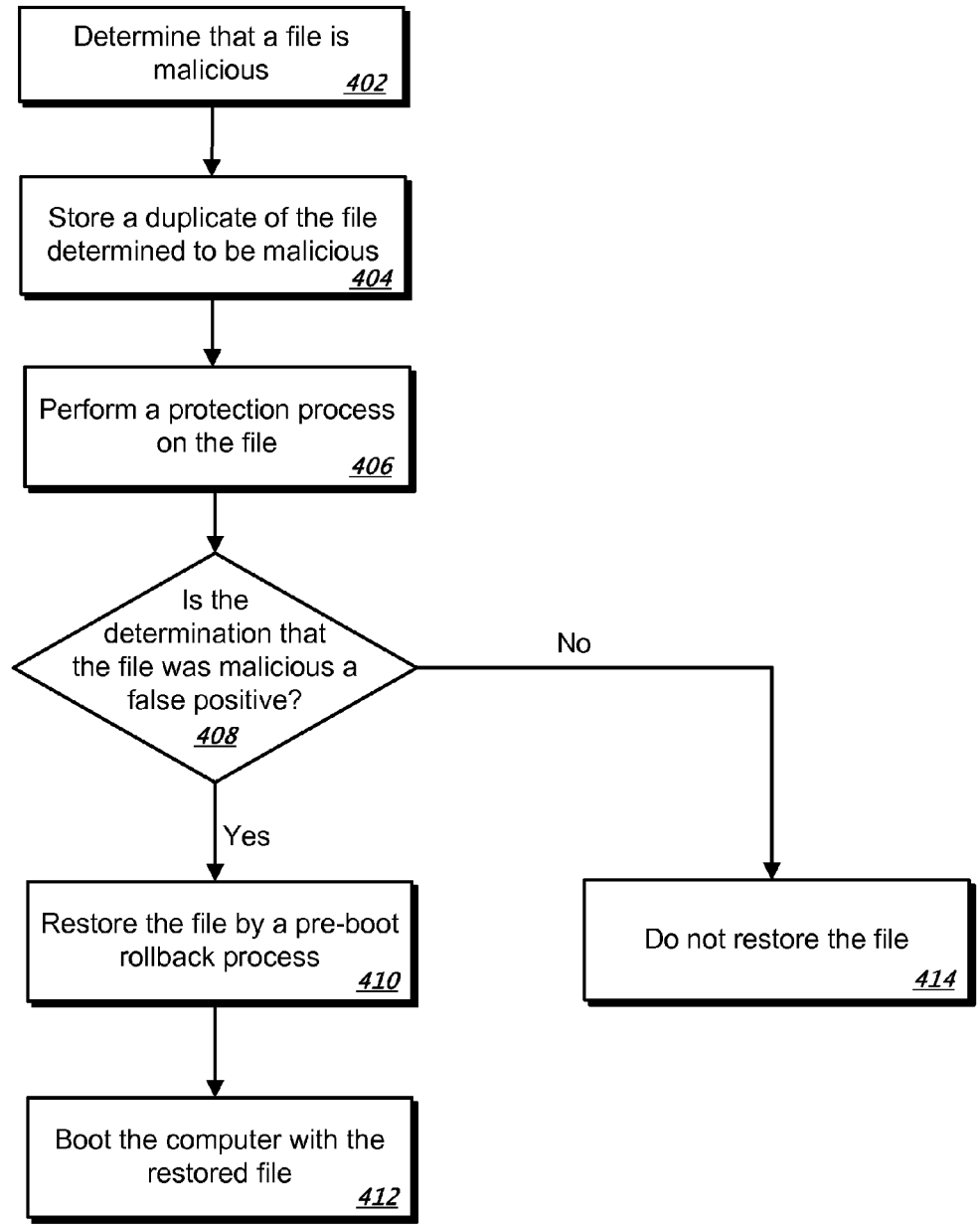
FIG. 4 is a flow diagram of an example rollback process.

FIG. 4 is a flow diagram of an example rollback process 400. The process 400 can, for example, be implemented by the malware protection program 102 of FIG. 1, and described in FIGS. 2 and 3.

Stage 402 determines that a file is malicious. The program 102 can identify malicious files based on a set of malware definitions. For example, if the file "goodprogram.exe" exhibits behavior matching the criteria outlined in the malware definitions, the program 102 can determine that the file "goodprogram.exe" is malicious.

Stage 404 stores a duplicate of the file determined to be malicious. The false positive processor 110 of the program 102 can store a duplicate of the file determined to be malicious in the quarantine 114. For example, the false positive processor 102 can store a copy of the file "goodprogram.exe" in a quarantined portion of memory that is logically separate from the main memory of the system.

Stage 406 performs a protection process on the file. The program 102 can perform a protection process to eliminate the threat provided by malware programs. The protection processes can include repairing the file, deleting the file, etc. For example, the protection processor 108 of the program 102 can delete the file "goodprogram.exe."

Stage 408 determines whether the determination that the file is a malicious file is a false positive determination. For example, the false positive processor 110 can determine from information provided to it by a remote server, a user interface, or some other input means if the file "goodprogram.exe" was incorrectly identified as a malicious file. The determination can be made during the pre-boot stage or post-boot stage, as described above.

If stage 408 determines that the determination that the file is a malicious file is a false positive determination, stage 410 restores the file to a state prior to the one or more protection processes that were performed on the file by executing a pre-boot rollback process on the computer during a boot sequence. For example, if the false positive processor 110 determines that the file "goodprogram.exe" is not malicious (i.e., a false positive determination), then the pre-boot processor 116 can restore the duplicate copy of the file "goodprogram.exe" from the quarantine 114. After stage 410, stage 412 boots the computer with the restored file. For example, after the file "goodprogram.exe" is restored to memory, the computer performs the normal boot sequence.

If stage 408 determines that the determination that the file is a malicious file is not a false positive determination, stage 414 does not restore the file to a state prior to the one or more protection processes performed on the file. For example, if the false positive processor 110 determines that the file "badfile.exe" is malicious (i.e., not a false positive determination), then the pre-boot processor 116 does not restore the duplicate copy of the file "badfile.exe" from the quarantine 114. The computer performs the normal boot sequence without the file "badfile.exe."

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. At least one non-transitory machine accessible storage medium having instructions stored thereon, the instructions when executed on a machine, cause the machine to:
   determine that a file stored in a first portion of a computer memory of a computer is a malicious file;
   store a duplicate of the file in a quarantine area in the computer memory, the quarantine area being in a second portion of the computer memory that is different from the first portion of the computer memory;
   perform one or more protection processes on the file;
   determine that the determination that the file is a malicious file is a false positive; and
   restore the file, during a boot sequence, to a state prior to the one or more protection processes being performed on the file, wherein the computer is to be booted with the restored file.

2. The storage medium of claim 1, wherein the file is to be restored by a pre-boot rollback process executing on the computer during the boot sequence.

3. The storage medium of claim 2, wherein the determination that the file is a malicious file is a false positive is determined during the pre-boot rollback process.

4. The storage medium of claim 1, wherein the instructions, when executed, are further to identify received false positive data, and determining that the determination that the file is a malicious file is a false positive is based on the false positive data.

5. The storage medium of claim 4, wherein the false positive data is received based on inputs of a user.

6. The storage medium of claim 5, wherein the inputs of the user comprise inputs received through a selection menu presented to the user during a pre-boot rollback process, wherein the selection menu includes an identification that the file is stored in the quarantine area and further includes a selection option to restore the file, the pre-boot rollback process is initiated in association with an interruption of a boot process, and the false positive data is based on selection by the user of the selection option.

7. The storage medium of claim 4, wherein the false positive data is received from a rollback server.

8. The storage medium of claim 7, wherein the false positive data comprises signatures of files identified as corresponding to false positive determinations of malware.

9. The storage medium of claim 8, wherein determining that the determination that the file is a malicious file is a false positive is based at least in part on determining that a signature of the file substantially matches at least one of the signatures of files included in the false positive data.

10. The storage medium of claim 1, wherein the one or more protection processes include deleting the file from the first portion of the computer memory.

11. The storage medium of claim 1, wherein the one or more protection processes include modifying contents of the file.

12. The storage medium of claim 11, wherein restoring the file comprises:
   deleting the modified file from the first portion of computer memory; and
   moving the file from the quarantine area to the first portion of computer memory.

13. A method comprising:
   determining that a file stored in a first portion of a computer memory of a computer is a malicious file;
   storing a duplicate of the file in a quarantine area in the computer memory, the quarantine area being in a second portion of the computer memory that is different from the first portion of the computer memory;
   performing one or more protection processes on the file;
   determining that the determination that the file is a malicious file is a false positive; and
   restoring the file, during a boot sequence, to a state prior to the one or more protection processes being performed on the file, wherein the computer is to be booted with the restored file.

14. The method of claim 13, wherein files determined to be malicious are not to be restored when the determination that the files are malicious are determined not to be false positives.

15. The method of claim 13, wherein the file is to be restored by a pre-boot rollback process executing on the computer during the boot sequence.

16. The method of claim 15, wherein the determination that the file is a malicious file is a false positive is determined during the pre-boot rollback process.

17. The method of claim 13, further comprising providing false positive data indicating that the file is not a malicious file, wherein the false positive data is for use by a malware protection program and the false positive data is to cause the malware protection program to determine that the file is not a malicious file.

18. A system, comprising:
   one or more processor devices;
   memory comprising a first memory component and a second memory component, wherein the first memory component is logically separate from the second memory component and the second memory component comprises a quarantine area;
   a malware protection program executable by at least one of the processors to:
      identify a malicious file stored in the first memory component; and
      perform a protection process on the malicious file; and
   rollback logic executable by at least one of the processors to:
      cause a copy of the malicious file identified by the malware protection program to be stored in the quarantine area;
      determine that a false positive determination has occurred relating to the identification of the malicious file; and
      restore the copy of the malicious file from the quarantine area to the first part of the memory component during a boot sequence.

19. The system of claim 18, further comprising a server interface which receives false positive data from a rollback server, the false positive data indicating false positive detections.

20. The system of claim 18, further comprising a user server interface which receives false positive data from a user, the false positive data indicating false positive detections.

21. The system of claim 18, wherein the first memory component comprises a first portion of a hard drive and the second memory component comprises a second portion of the hard drive.

22. The system of claim 18, wherein the second memory component comprises a protected storage area of memory.

* * * * *